(12) United States Patent
Uetake et al.

(10) Patent No.: US 7,042,874 B1
(45) Date of Patent: May 9, 2006

(54) DIGITAL SWITCHING SYSTEM AND METHOD OF SWITCHING DATA OF SAME

(75) Inventors: Yoshikatsu Uetake, Tokyo (JP); Seiichi Futami, Tokyo (JP); Kentaro Hayashi, Chiba (JP); Hiroshi Satou, Chiba (JP)

(73) Assignee: Oki Electric Industry Co., Ltd, Tokyo (JP)

( * ) Notice: Subject to any disclaimer, the term of this patent is extended or adjusted under 35 U.S.C. 154(b) by 890 days.

(21) Appl. No.: 09/645,875

(22) Filed: Aug. 25, 2000

(30) Foreign Application Priority Data

Aug. 27, 1999 (JP) .................................. 11-240936

(51) Int. Cl.
*H04Q 11/00* (2006.01)

(52) U.S. Cl. .................. 370/379; 370/360; 711/167
(58) Field of Classification Search ................ 370/358, 370/360, 363, 368, 371, 419, 374–382, 395.7
See application file for complete search history.

(56) References Cited

U.S. PATENT DOCUMENTS

| | | | | |
|---|---|---|---|---|
| 4,512,014 A | * | 4/1985 | Binz et al. | 370/358 |
| 4,656,625 A | * | 4/1987 | Nojiri et al. | 370/267 |
| 4,680,752 A | * | 7/1987 | Takemura et al. | 370/378 |
| 4,740,953 A | * | 4/1988 | Matsumoto et al. | 370/381 |
| 4,759,010 A | * | 7/1988 | Murata et al. | 370/379 |
| 4,759,012 A | * | 7/1988 | Suzuki | 370/379 |
| 4,972,407 A | * | 11/1990 | Kawai | 370/376 |
| 5,040,174 A | * | 8/1991 | Takeuchi et al. | 370/368 |
| 5,123,012 A | * | 6/1992 | Suzuki et al. | 370/379 |
| 5,130,979 A | * | 7/1992 | Ohtawa | 370/374 |
| 5,155,728 A | * | 10/1992 | Takeuchi et al. | 370/509 |
| 5,353,281 A | * | 10/1994 | Kuwahara et al. | 370/378 |
| 5,430,718 A | * | 7/1995 | Petersen | 370/378 |
| 5,467,340 A | * | 11/1995 | Umezu | 370/244 |
| 5,627,826 A | * | 5/1997 | Kameda et al. | 370/371 |
| 5,862,136 A | * | 1/1999 | Irwin | 370/395.4 |
| 6,034,959 A | * | 3/2000 | Mizukoshi et al. | 370/395.72 |
| 6,137,795 A | * | 10/2000 | Tominaga et al. | 370/375 |
| 6,269,097 B1 | * | 7/2001 | Keun et al. | 370/375 |
| 6,556,566 B1 | * | 4/2003 | Ikeda | 370/376 |
| 6,570,873 B1 | * | 5/2003 | Isoyama et al. | 370/375 |

* cited by examiner

*Primary Examiner*—Steven Nguyen
*Assistant Examiner*—Clemence Han
(74) *Attorney, Agent, or Firm*—Rabin & Berdo, PC

(57) ABSTRACT

A digital switching system includes a multiplexer for multiplexing time slots from a plurality of circuits, a switching memory for storing and switching the multiplexed data for one frame period, switching control equipment for directing the interchange of the time slots stored in the switching memory in response to a switching request from an upper layer controller in a network, and a demultiplexer for demultiplexing into the plurality of circuits the time slot data as read out using address data supplied from the switching control equipment. The switching control equipment includes a control memory unit for writing connection information from the upper layer controller to either a first or a second control memory, and sequentially reading out the stored connection information in read-out order for the switching memory, and a selection unit for selecting read-out from either the first or the second control memory in response to the switching request.

5 Claims, 9 Drawing Sheets

SCHEMATIC CONFIGURATION OF SWITCHING CONTROL EQUIPMENT

SCHEMATIC CONFIGURATION OF SWITCHING CONTROL EQUIPMENT

DATA SWITCHING RELATIONSHIP

SCHEMATIC CONFIGURATION OF CONVENTIONAL DIGITAL SWITCH

CONFIGURATION OF ANOTHER EMBODIMENT
OF SWITCHING CONTROL EQUIPMENT

FIG. 7

| WORK MEMORY | | |
|---|---|---|
| ADDRESS | WRITE ADDRESS | WRITE DATA |
| 0 | 0 | 0 |
| 1 | 2 | 1 |
| 2 | X | 2 |
| 3 | K-1 | 3 |
| ⋮ | | |
| Y-1 | | |

CONTENTS OF MEMORY

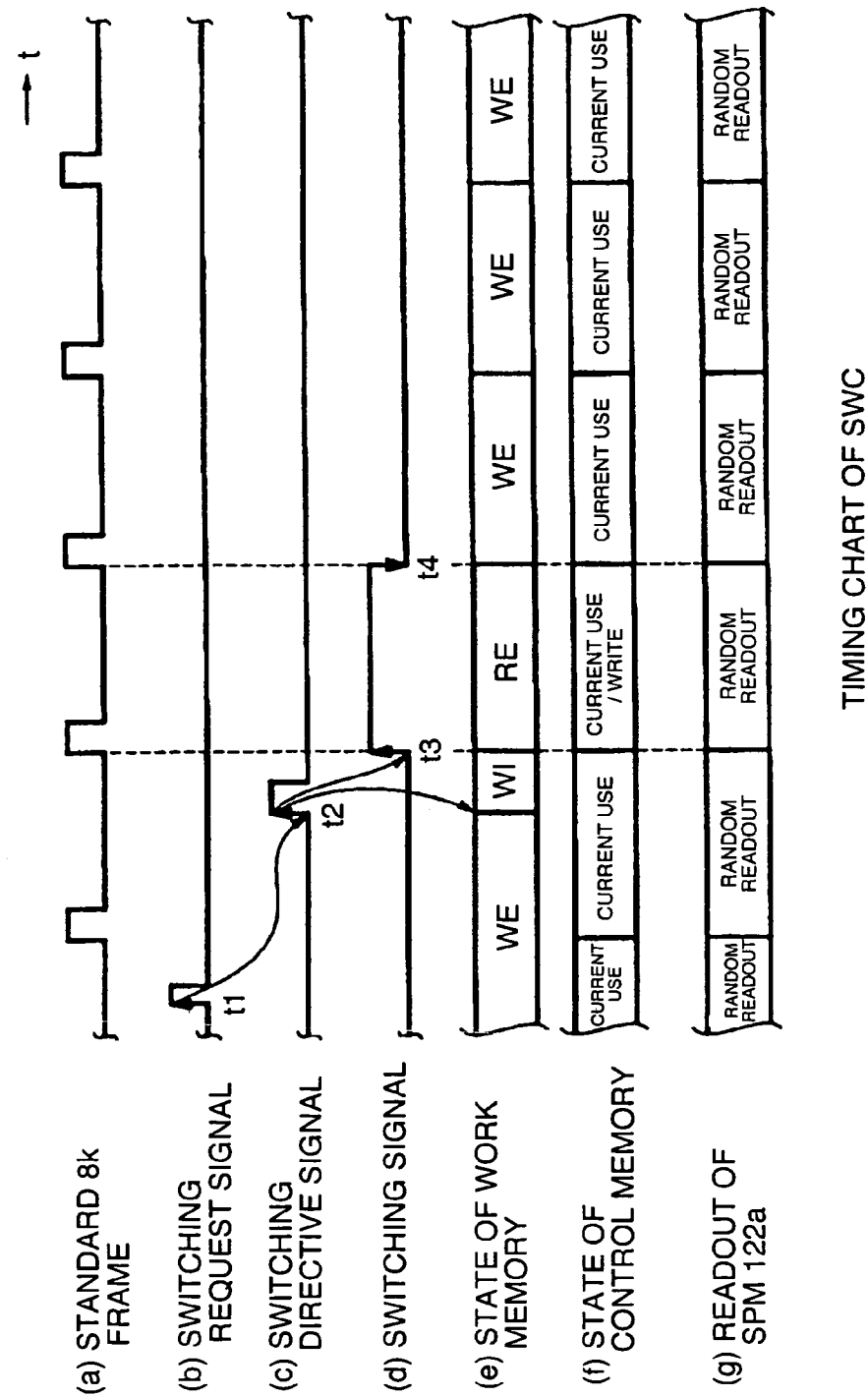

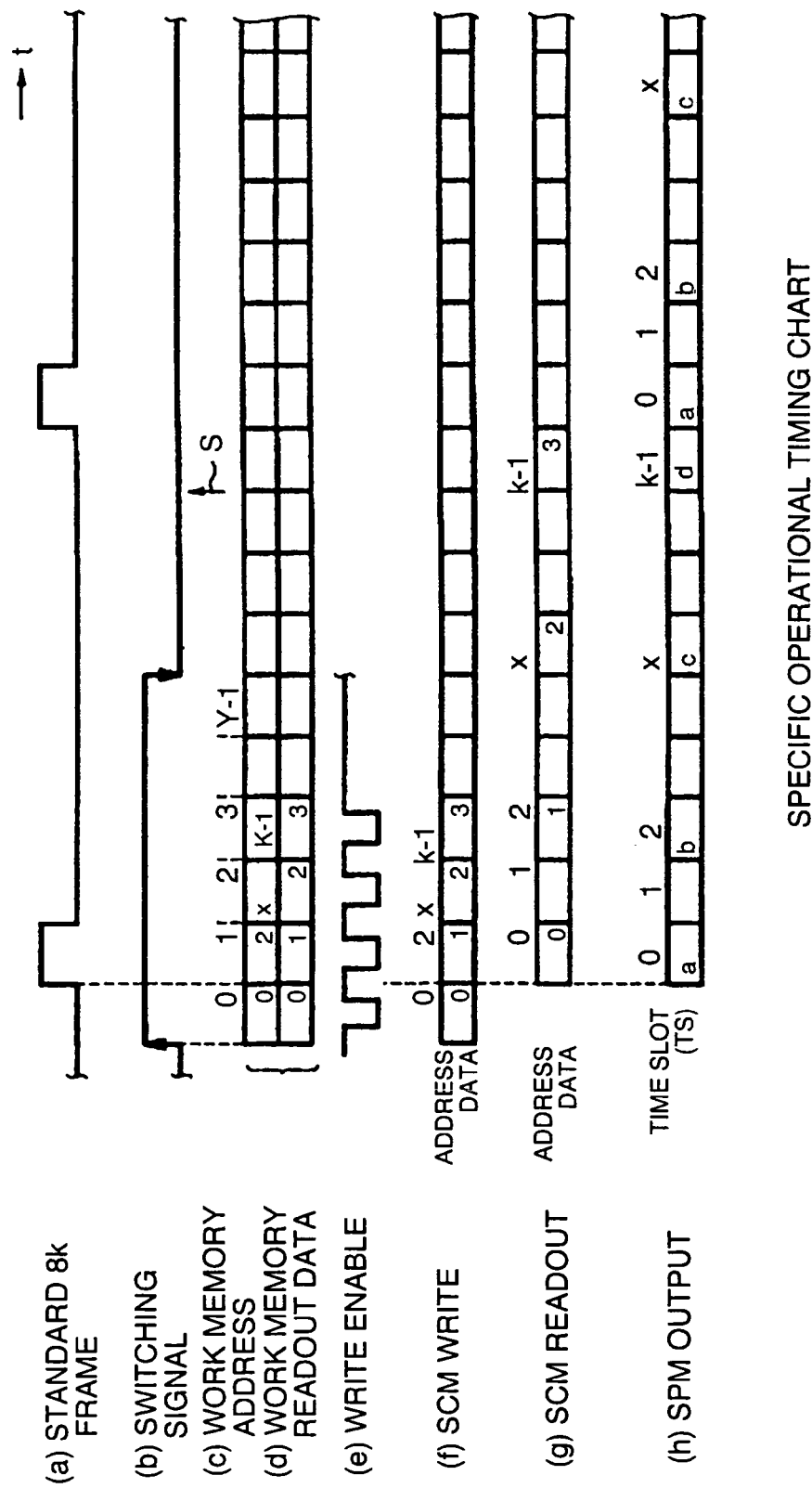

DIGITAL SWITCHING SYSTEM AND METHOD OF SWITCHING DATA OF SAME

BACKGROUND OF THE INVENTION

1. Field of the Invention

The present invention relates to a digital switching system, and a method of switching data of the same. In particular, the invention is concerned with a speech path apparatus of a digital switch, and is suitable for use, for example, in case of changing a highway where data is to be accommodated.

2. Description of the Related Art

In a digital switch having a connection configuration wherein the input side of a speech path apparatus in a distribution stage is connected with a plurality of receiving (or inputting) highways, and the output side of the speech path apparatus is connected with a plurality of transmitting (or outputting) highways, connection among the plurality of either the inputting or the outputting highways is switched by controlling the speech path apparatus in response to connection information supplied from an upper layer controller. Data with a time-shared time slot as a unit of data are supplied, and outputted via the highways. Each frame making up a plurality of data units supplies L time slots accommodated therein at a frequency of, for example, 8 kHz. It follows therefore that switching of data through the intermediary of the speech path apparatus in the distribution stage corresponds to interchange of the time slots among the plurality of either the inputting or the outputting highways.

With such a digital switch as described above, an increase in the number of the highways accommodated therein results in expansion in the scale on which the time slots are interchanged, and accordingly, a primary switch (T switch)—a highway switch (S switch)—a secondary switch (T switch) are connected in multiple stages with the speech path apparatus in the distribution stage to which highway interface units are connected. Such connection results in expansion in the scale of a network. Besides, in the case where subscribers are accommodated, the speech path apparatus in the distribution stage and interface units on the side of the subscribers are connected with the digital switch.

In general, a switch is provided with a redundant highway serving as a backup in addition to its configuration made up of highways for current use so as to be able to limit a range of trouble even if, for example, the trouble occurs to any of the highways. With a digital switch provided with a countermeasure for occurrence of trouble, connection thereof with highways is switched from one of them in current use to one for use as a backup, in step with synchronization between the apparatus and the unit. By means of such switching, an operation is executed such that neither omission nor duplication occurs to data transmitted through the highways.

As described in the foregoing, the conventional digital switch adopts a three-stage configuration, excellent in respect of traffic characteristics, economics, and potential for capacity expansion, which is implemented on a single plane, allowing parallel switching to be effected, however, the primary switch and the secondary switch (T switch) as a selector need to be installed between the highway interface units and a highway switch of the speech path apparatus in the distribution stage, respectively. Such a configuration results in an increase of the scale of the system. Furthermore, since synchronization by clock is executed through the selectors, delay occurs to digital data. Consequently, a data transit time throughout the whole system is lengthened.

Further, the redundant configuration providing for the backup constitutes additional highway units. Since one or more highways are provided for as backup highways, this will result in deterioration of utilization efficiency of the resources of the conventional digital switch.

SUMMARY OF THE INVENTION

The invention has been developed to eliminate such drawbacks of the related art as described above, and it is an object of the invention to provide a digital switching system and a method of switching data of the same, capable of effecting switching without causing deterioration in data transmission service even if a compact configuration is adopted.

To solve the problems as described above, a digital switching system according to the invention comprises multiplexing means for multiplexing time slots from a plurality of circuits, multiplexed respectively, by the multiplexed time slot unit, switching memory means for storing and switching data of the time slots supplied from the multiplexing means, for one frame portion, switching control means comprising switching correspondence means for directing interchange of the time slots of the switching memory means in response to a switching request from an upper layer controller, and demultiplexing means for demultiplexing data as read out using data supplied from the switching correspondence means as addresses of the switching memory means into the plurality of the circuits, the switching correspondence means further comprising information receiving means for receiving connection information from the upper layer controller, read-out regulating means for writing the connection information received through the information receiving means to an address designated by the connection information, in a first memory means and a second memory means, respectively, for storing the connection information corresponding to before or after switching/and sequentially reading out the connection information stored, in read-out order of the switching memory means, network switching control means for generating a switching signal in synchronization with an internal standard timing in response to a switching directive of a network, delivered from the upper layer controller, and read-out selection means for selecting read-out from either the first memory means of the read-out regulating means or the second memory means of the same in response to the switching signal delivered from the network switching control means.

In this connection, with the read-out regulating means, the first memory means and the second memory means are preferably capable of independently and simultaneously writing and reading, respectively.

The network switching control means preferably generates the switching signal so as to coincide with the forefront of a frame. By generating the switching signal in this way, it will become easier to achieve synchronization with internal timing.

It is preferable that the switching correspondence means comprises switching memory means for writing by the switching unit the connection information supplied from the information receiving means, disposed between the information receiving means and the read-out selection means, the switching memory means read out connection information with the switching signal from the network switching control means, written as a read-out signal, the read-out selection means is supplied with the connection information from the switching memory means and the information receiving means, respectively, outputting either of the connection information to the read-out regulating means in response to the switching signal from the network switching control means, and the read-out regulating means is connected with the switching memory means.

With the digital switching system according to the invention, digital data from the plurality of circuits, turned into the time slots multiplexed by the multiplexing means, are stored in the switching memory means. As a result, a scale of the system is reduced in comparison with a case where selectors are adopted for a system while delay time is limited. The information receiving means of the switching correspondence means receives the connection information from the upper layer controller, and supplies the same to the read-out regulating means. The read-out regulating means write the connection information to the address designated by the connection information, in the first memory means and the second memory means, respectively. These addresses are located so as to correspond to data send-out order for read-out addresses of the switching memory means. The read-out selection means select the read-out from either the first memory means of the read-out regulating means or the second memory means of the same in response to the switching signal generated in the network switching control means, thereby ensuring switching, for example, from the forefront of the frame as the standard timing. The switching memory means supplies data to the demultiplexing means using data supplied via the read-out selection means, as addresses of the switching memory means, and demultiplexes the data to be supplied to the plurality of the circuits, respectively.

Further, to solve the problems as described above, a method of switching data of the digital switching system, according to the invention comprises a multiplexing step of multiplexing time slots supplied from a plurality of circuits, a writing step of sequentially writing into a switching memory data of the time slots multiplexed by the multiplexing step, a data interchange step comprising receiving connection information supplied from an upper layer controller, corresponding to before and after switching, respectively, writing the connection information into a control memory at addresses contained in the connection information, sequentially reading out the connection information stored in the control memory as the read-out order of the multiplexed time slot data, in synchronization with an internal timing standard in response to a switching directive from the upper layer controller, so as to change the accommodation destinations of the multiplexed time slot data, and a demultiplexing step of demultiplexing the data from the data interchange step into a plurality of circuits.

In this connection, the data interchange step preferably comprises an information receiving step of receiving the connection information supplied from the upper layer controller before switching, and the same after switching, respectively, an information input/output step of storing the connection information received in the information receiving step, and reading out the connection information supplied before and after switching, a switching signal generation step of generating a switching signal for switching in synchronization with the timing in response to the switching directive of the connection information supplied from the upper layer controller, a selection step of selecting the connection information after switching of all the connection information as read out in the information input/output step in response to the switching signal generated, and a read-out step of reading out the multiplexed data as written in the writing step on the basis of the connection information selected in the selection step.

Further, the data interchange step comprises an information receiving step of receiving the connection information supplied from the upper layer controller before switching, and the same after switching, respectively, an information writing step of writing the connection information for use as a backup after switching of all the connection information received in the information receiving step, when a switching request is delivered from the upper layer controller, a switching signal generation step of generating a switching signal for switching in synchronization with the timing in response to the switching directive of the connection information supplied from the upper layer controller, a selection step of selecting the connection information in response to the switching signal generated, a copying step of reading out the connection information selected in the selection step after switching on the rising edge of the switching signal generated in the switching signal generation step as the connection information before switching, and a read-out step of storing the connection information as read out in the copying step, and reading out the multiplexed data as written in the writing step on the basis of the connection information.

Further, the copying step may read out addresses and data contained in the connection information written in the information writing step, in increasing address order, supplying the same to the read-out step, and the read-out step may write data of connection information, as supplied, to an address indicated by the connection information, as supplied, while reading out the data written in increasing address order; and using the data as read-out addresses for the data of the time slots written in the writing step.

With the method of switching data of the digital switching system, according to the invention, time slots supplied from a plurality of circuits are multiplexed, and multiplexed data are sequentially written. Meanwhile, connection information before, and after switching, supplied from the upper layer controller, is received, and a switching signal is generated in response to a switching directive delivered from the upper layer controller. By supplying the connection information after switching prior to switching by the switching signal, and subsequently effecting switching by the switching signal, data is supplied to a plurality of circuits without causing omission and duplication such that the data multiplexed based on the connection information obtained by switching at the beginning of the frame are read out and demultiplexed.

BRIEF DESCRIPTION OF THE DRAWINGS

FIG. 7 is a view showing the contents of a work memory shown in FIG. 6;

FIG. 8 is a timing chart for illustrating operation of the digital switch, under control by the speech control equipment in FIG. 6; and FIG. 9 is a timing chart similar to FIG. 8, but for illustrating the operation in more specific terms taking into account", connection information.

DETAILED DESCRIPTION OF THE PREFERRED EMBODIMENTS

Preferred embodiments of a digital switching system according to the invention are described in detail hereinafter with reference to the accompanying drawings.

Figure 1:
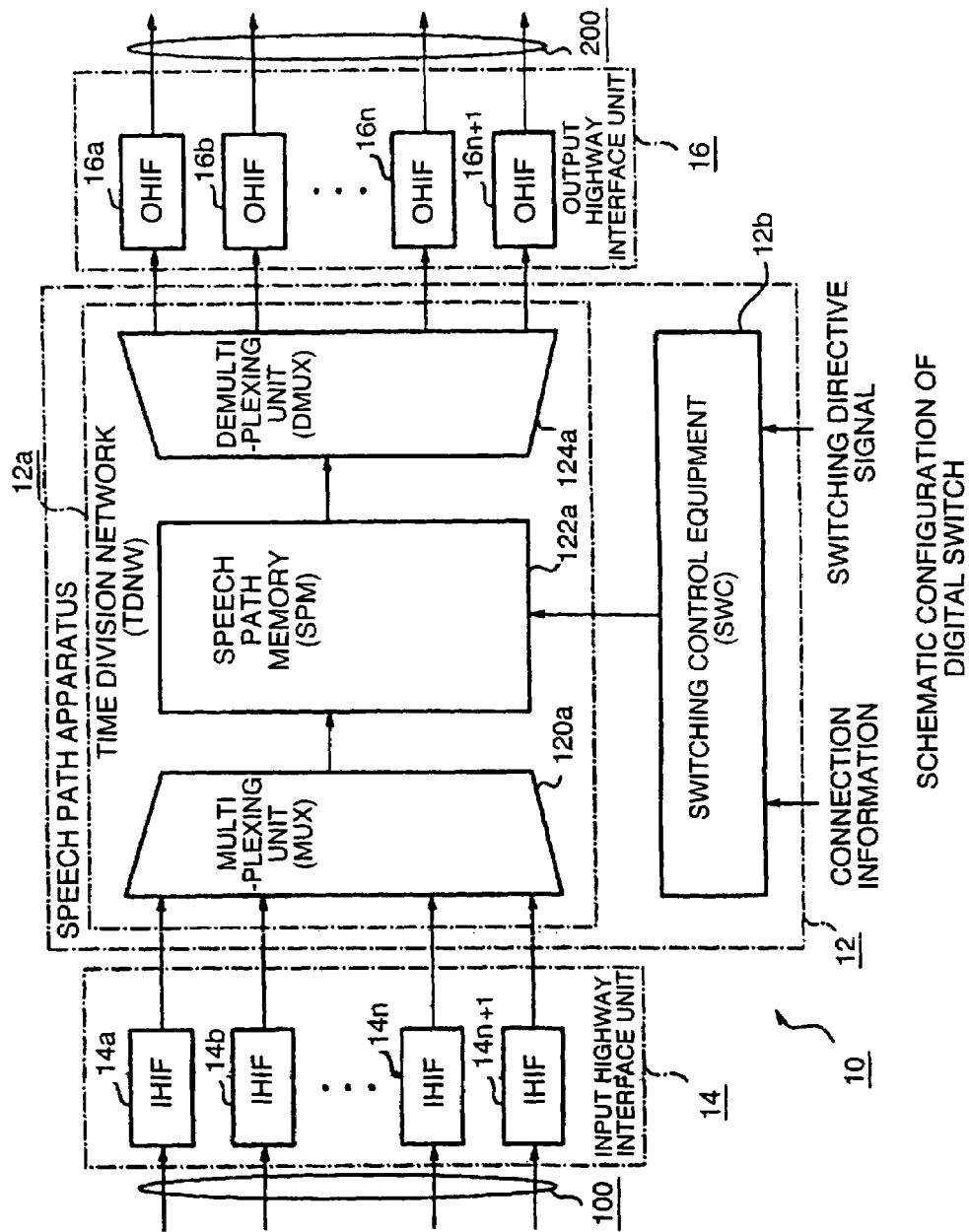
FIG. 1 is a block diagram broadly showing the configuration of an embodiment of a digital switching system according to the invention, as applied to a digital switch.

The digital switching system according to the invention is applied to a speech path apparatus 12 of a digital switch 10. With the speech path apparatus 12, respective transmission paths 100 as shown in FIG. 1 by way of example are connected with the input side thereof via an input highway interface unit 14, and the output side thereof is connected with respective transmission paths 200 via an output highway interface unit 16. The input highway interface unit 14 and the output highway interface unit 16 are provided with (n+1) lines of input highway interface (IHIF) circuits, and (n−t−1) lines of output highway interface (OHIF) circuits, respectively. However, a (n+1)-th line of the input highway interface (IHIF) circuits, and the output highway interface (OHIF) circuits, respectively, is provided as a backup for use when trouble occurs, and all other highways have been put in service, and as such, is not normally used even if a switching request is made. A configuration of the speech path apparatus 12, enabling switching to be effected without use of the (n+1)-th line is described hereinafter.

The speech path apparatus 12 is provided with a time a and a speech-control equipment (referred to" hereinafter as 12b. Further, the speech path apparatus 12 comprises a network clock (NCLK) and a speech path common control (SPCC), which are not shown in the figure, as' well.

The TDNW 12a is provided with a multiplexing (MUX) unit 120a, a speech path memory (referred to hereinafter as SPM) 122a, and a demultiplexing (DMUX) unit 124a. The multiplexing unit 120a is a multiplexing circuit based on time slots, wherein L units of digital data supplied from the input highway interface unit 14 are treated as a data quantity handled by each of the highways, and n highways as multiplexed constitutes each frame.

The multiplexing unit 120a multiplexes data upon receiving of, for example, multiplexing/demultiplexing clock signals (not shown) as supplied, and then supplies the data thus multiplexed to the SPM 122a. The SPM 122a has a storage capacity for storing by the time slot one frame of data supplied. The operation of the SPM 122a will be described at a later stage when timing will be explained. The demultiplexing unit (DMUX) 124a is a demultiplexing circuit wherein data rows supplied from the SPM 122a are demultiplexed into L pieces of time slot data for the respective highways as described above. The demultiplexing unit 124a demultiplexes the data according to the multiplexing/demultiplexing clock signals.

Figure 2:
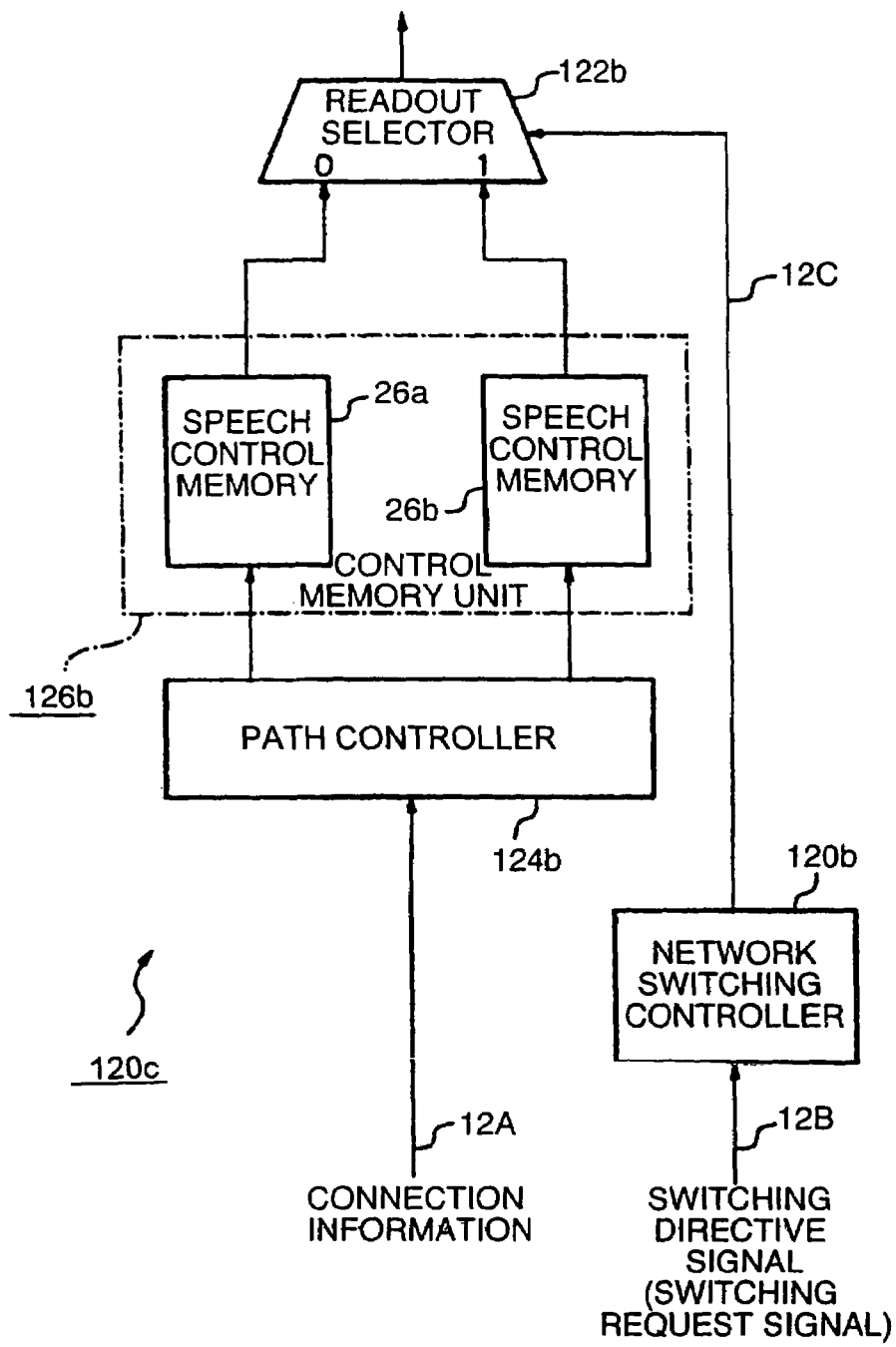
FIG. 2 is a block diagram broadly showing the configuration of a switching correspondence unit incorporated in a speech control equipment of the digital switch in FIG. 1.

As shown in FIG. 2, the SWC 12b is a circuit for controlling switching of speech path routing in case of executing switching due to trouble, and so forth, based on connection information 12A and a switching directive signal 12B. The connection information 12A and the switching directive signal 12B are supplied via a SP bus (not shown). The SWC 12b incorporates a switching correspondence unit 120c comprising a network switching controller 120b, a read-out selector 122b, a path controller 124b, and a control memory unit 126b.

The network switching controller 120b comprises a circuit for generating a switching signal 12C synchronized with timing of the speech path apparatus 12 when the switching directive signal 12B is supplied. The network switching controller 120b delivers the switching signal 12C as generated to the read-out selector 122b. The read-out selector 122b is a circuit for selecting information to be supplied in response to the switching signal 12C, and is provided with, for example, a selector switch, and so forth, capable of preventing generation of noises, which are otherwise generated accompanying switching, even if high speed switching is executed. The path controller 124b is provided with an input interface circuit for receiving the connection information 12A supplied from a controller on the side of an upper layer via the SP bus, and an output interface circuit for outputting the connection information 12A as received. The path controller 124b delivers the connection information 12A as received to the control memory unit 126b.

The control memory unit 126b comprises speech control memories 26a, 26b, for current use, and for use as a backup, respectively, in the initial stage of operation. The speech control memories 26a, 26b are independent-two-port memories, capable of writing and reading simultaneously. The respective speech control memories 26a, 26b have a capacity required for interchanging one frame of time slot data. Although not shown in the figure, write/read enable signals, and write/read data signals are delivered to the speech control memories 26a, 26b, respectively. The speech control memories 26a, 26b execute writing/reading of the connection information 12A in response to the write/read enable signals, and the write/read data signals. The speech control memories 26a, 26b output the connection information 12A, as read out, to the terminal 0 and the terminal 1 of the read-out selector 122b, respectively.

The speech control memories 26a, 26b need not be limited to the two-port memories, but may be common-one-port memories. In such a case, use time of the port of the memories may be time-shared according to writing/reading. The SWC 12b is not for controlling the multiplexing unit 120a and the demultiplexing unit 124a of the TDNW 12a, but is for outputting the connection information to the SPM 122a.

Figure 3:
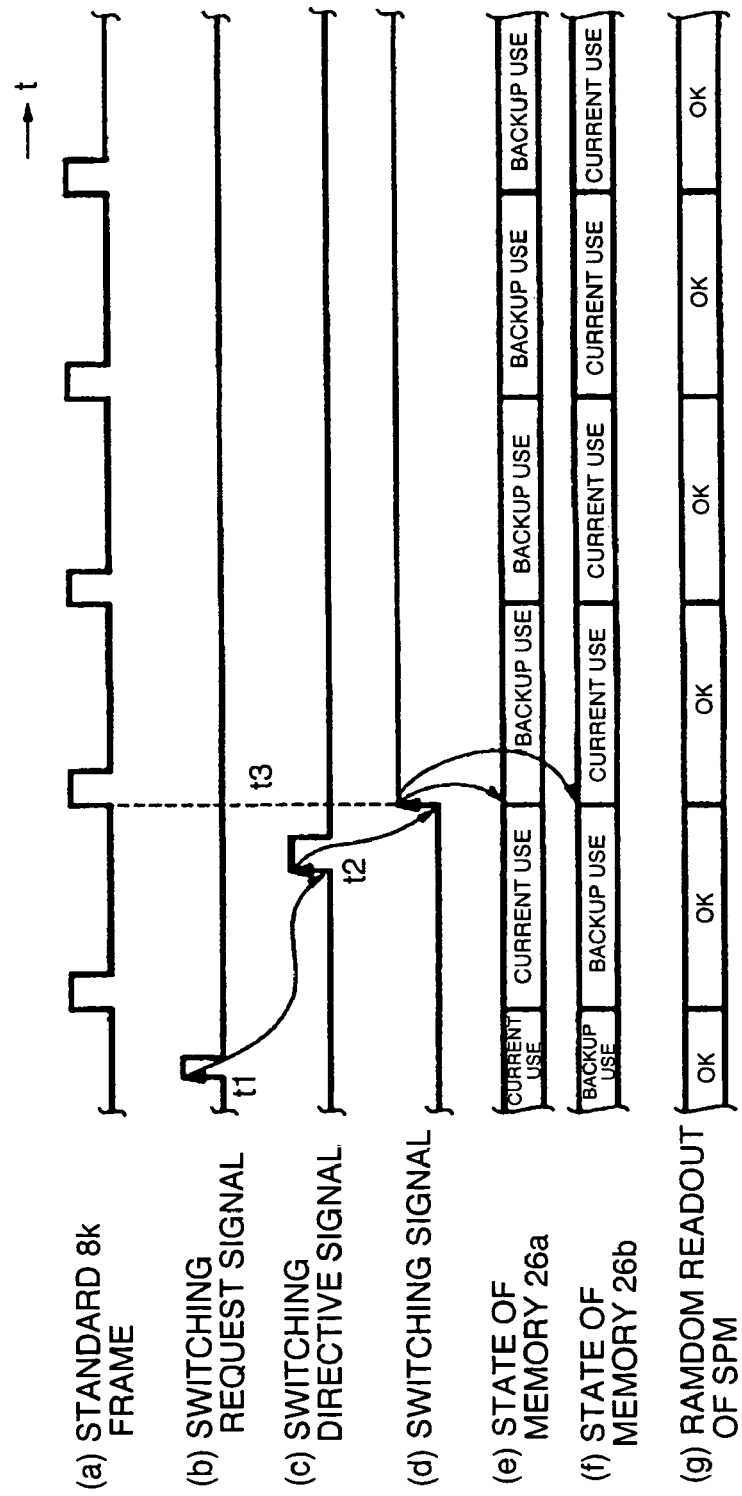
FIG. 3 is a timing chart for illustrating operation of the digital switch, under control by the speech control equipment in FIG. 2.

Now, operation of the speech path apparatus 12 of the digital switch 10 is described hereinafter with reference to a timing chart shown in FIG. 3. In this connection, reference will also be made to FIGS. 1 and 2 as necessary. Standard 8k frames are supplied to the speech path apparatus 12 via the NCLK (not shown). The standard 8k frames represent clocks supplied by, for example, a network synchronous equipment although not shown in FIGS. 1 and 2 {refer to FIG. 3 (a)}. Other clocks at various frequencies as required for respective component units of the speech path apparatus 12 are supplied thereto. By use of the standard 8k frames, synchronization is effected within the speech path apparatus. Now, operational timing of the SWC 12b is described hereinafter. A switching request signal S_Req. for effecting switching from the speech control memory for current use to the same for backup use at timing t1 is supplied from a central controller (not shown) belonging to an upper layer control system to the network switching controller 120b of the speech path apparatus 12 {refer to FIG. 3 (b)}. With the present embodiment of the invention, on the basis of delivery of the switching request signal S_Req., the connection information 12A supplied at this point in time is fetched. The connection information 12A supplied at this point in time includes information for switching to the (n+1)-th highway (i.e., transmission path) excluding the n-th highway, and so forth. The connection information 12A will be further described at a later stage. The central controller supplies the switching directive signal 12B to the network switching controller 120b with the elapse of a predetermined length of time. The switching directive signal 12B is supplied at timing t2 {refer to FIG. 3 (c)}. The network switching controller 120b makes use of the standard 8k frame as described above for an internal synchronous signal. The network switching controller 120b generates the switching signal 12C synchronized with the rising edge of the synchronous signal {refer to FIG. 3 (d)}. The switching signal 12C as generated are delivered to the read-out selector 122b. Thus, the state of the SWC 12b will be divided into one before switching and one after switching at timing t3 as the threshold therebetween.

The connection information 12A is supplied to the control memory unit 126b via the path controller 124b. Before switching, the speech control memory 26a of the control memory unit 126b serves as a memory for current use while the speech control memory 26b serves as a backup memory. Before switching, the connection information 12A stored in the speech control memory 26a is supplied to the SPM 122a shown in FIG. 1 via the read-out selector 122b.

Bit multiplexing is applied to one time slot in one of the highways, and L time slots as multiplexed in one frame are supplied to the MUX unit 120a of the TDNW 12a. The MUX unit 120a is connected with (n+1) lines of the highways of the input highway interface unit 14. The MUX unit 120a multiplexes data for n highways, supplied by the unit of the time slots thus multiplexed, for every time slot. The data thus multiplexed are supplied to the SPM 122a. Further, a selection signal (not shown) for selecting which highway is to be used for multiplexing is also supplied from the SWC 12b to the MUX unit 120a.

Figure 4:
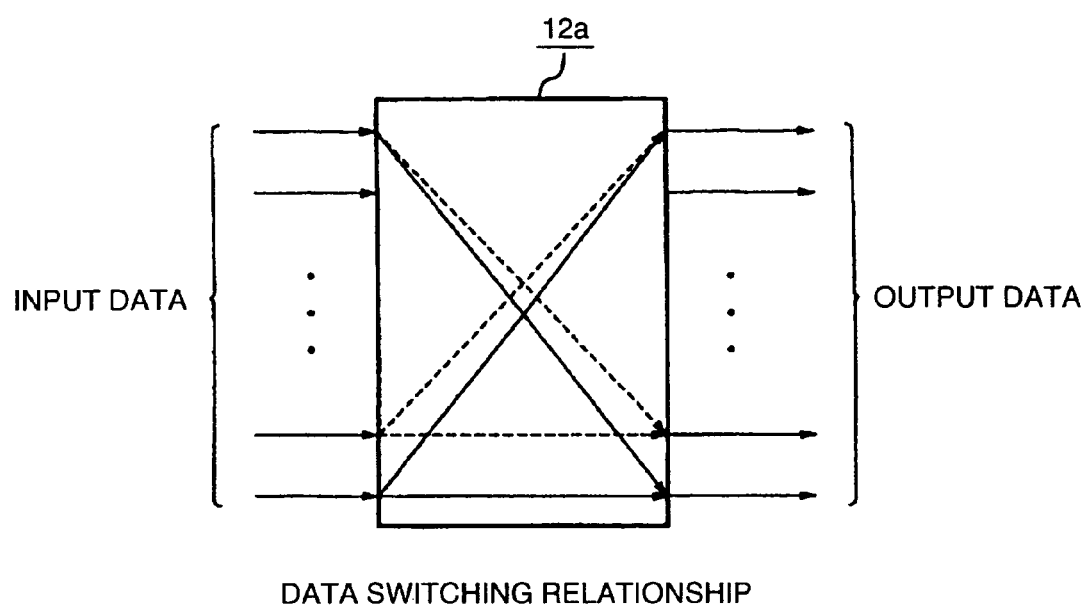
FIG. 4 is a schematic diagram for illustrating switching relationship of the digital switch.

The SPM 122a sequentially writes the data supplied thereto in every time slot. The SPM 122a executes random read-out by use of pieces of information C1, C2 of the connection information 12A, supplied from the SWC 12b as described above, as read-out addresses. In the random read-out, the time slots are interchanged in input/output relationship of the TDNW 12a such that, for example, as shown by the arrows indicated by the broken lines in FIG. 4, the input data of the IHIF circuit 14n are outputted to n lines of the highways, that is, the OHIF circuits 16a to 16n, in response to the piece of the information C1. As shown by the arrows indicated by the broken lines, data is interchanged by interchange of the time slots such that the input data supplied via the IHIF circuits 14a to 14n are supplied to the OHIF circuit 16n in response to the piece of the information C2. The data that are read out are supplied to the DMUX unit 124a. The DMUX unit 124a causes L pieces of data as multiplexed by the time slot unit to be demultiplexed into data for each of n lines of the highways before outputting the same.

Now, referring back to FIG. 3, in the course of the data interchange, the connection information 12A is supplied from the speech control memory 26a of the SWC 12b via the read-out selector 122b so as to be put to current use. The speech control memory 26b is for use as a backup. Within a time period between the timing t1 when the switching request signal S_Req. has been supplied, and the timing t2 when the switching directive signal is supplied, the connection information 12A after switching is supplied to the speech control memory 26b for use as the backup. With the read-out selector 122b, in response to the switching signal generated at the forefront of the frame, that is, at the timing t3, a relationship between the speech control memories 26a, 26b is changed from that of current use/backup use to that of backup use/current use {refer to FIG. 3 (e), (f)}.

After such switching, the TDNW 12a makes use of the (n+1)-th highway instead of the n-th highway in response to pieces of information C11, C22 of the connection information 12A, stored in the speech control memory 26b. Such a relationship is shown by the solid lines in FIG. 4. With respect to input data supplied via the IHIF circuit 14 (n+1) excluding the n-th line, data interchange is executed in response to the piece of information C11 of the connection information 12A delivered from the SWC 12b. Input data supplied via the n lines of the highways ranging from the IHIF circuits 14a to 14 (n+1), excluding the n-th line, are delivered to time slots in the (n+1)-th highway instead of those in the n-th line, thereby data interchange being executed. The data that are read out are supplied to the DMUX unit 124a shown in FIG. 1. The DMUX unit 124a causes the L pieces of time slot data to be demultiplexed into data for each of the n highways before outputting the same.

Such updating of the connection information 12A between current use and backup use may be effected by keeping the connection information, for current use and backup use, respectively, ready all the time before switching so that only the connection information which is an object for switching is supplied to the speech control memory for backup use upon receiving the switching request signal. Otherwise, when the switching request signal is supplied, all the connection information may be set in the speech control memory for backup use.

Figure 5:
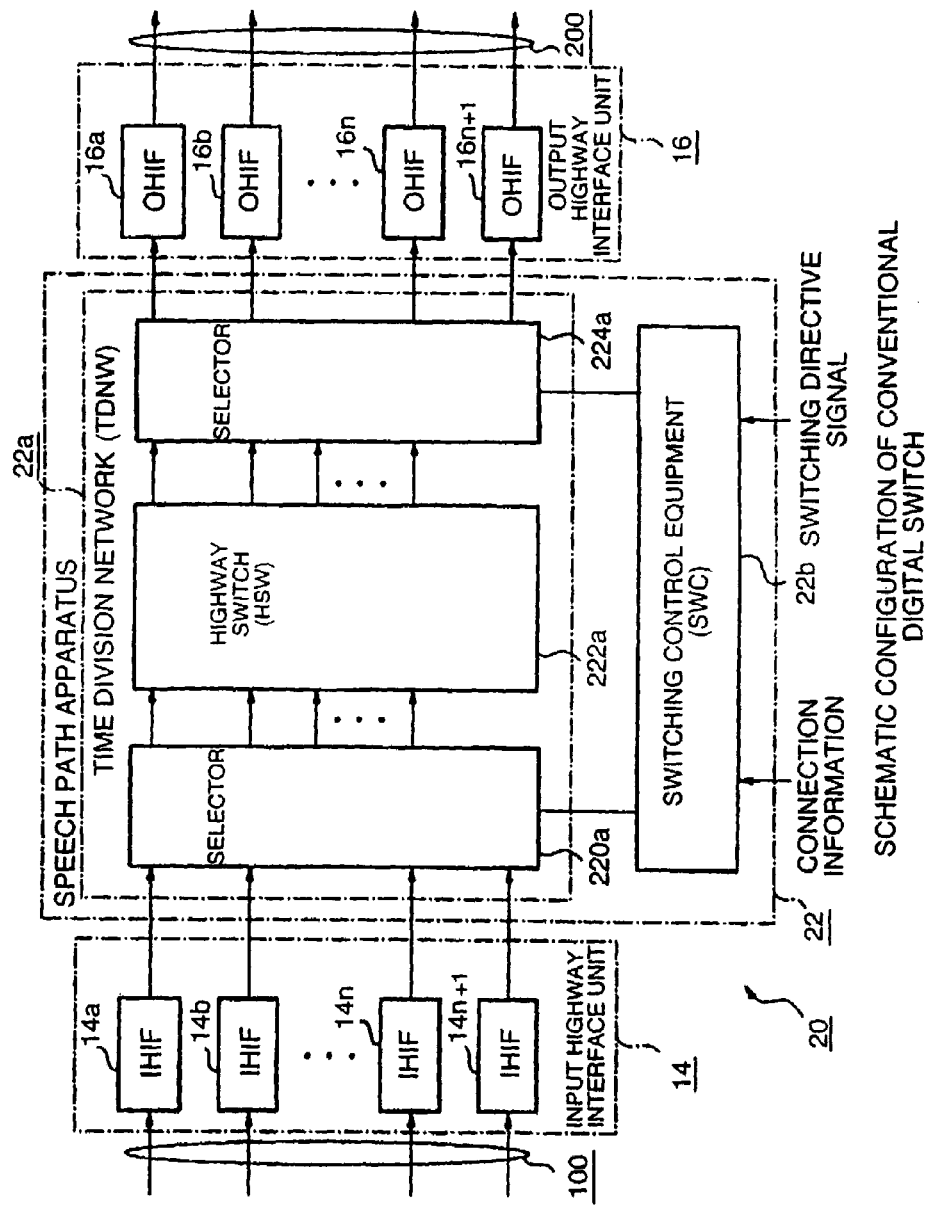
FIG. 5 is a block diagram broadly showing the configuration of a digital switching system cited as a comparative example against the digital switching system shown in FIG. 1.
Figure 6:
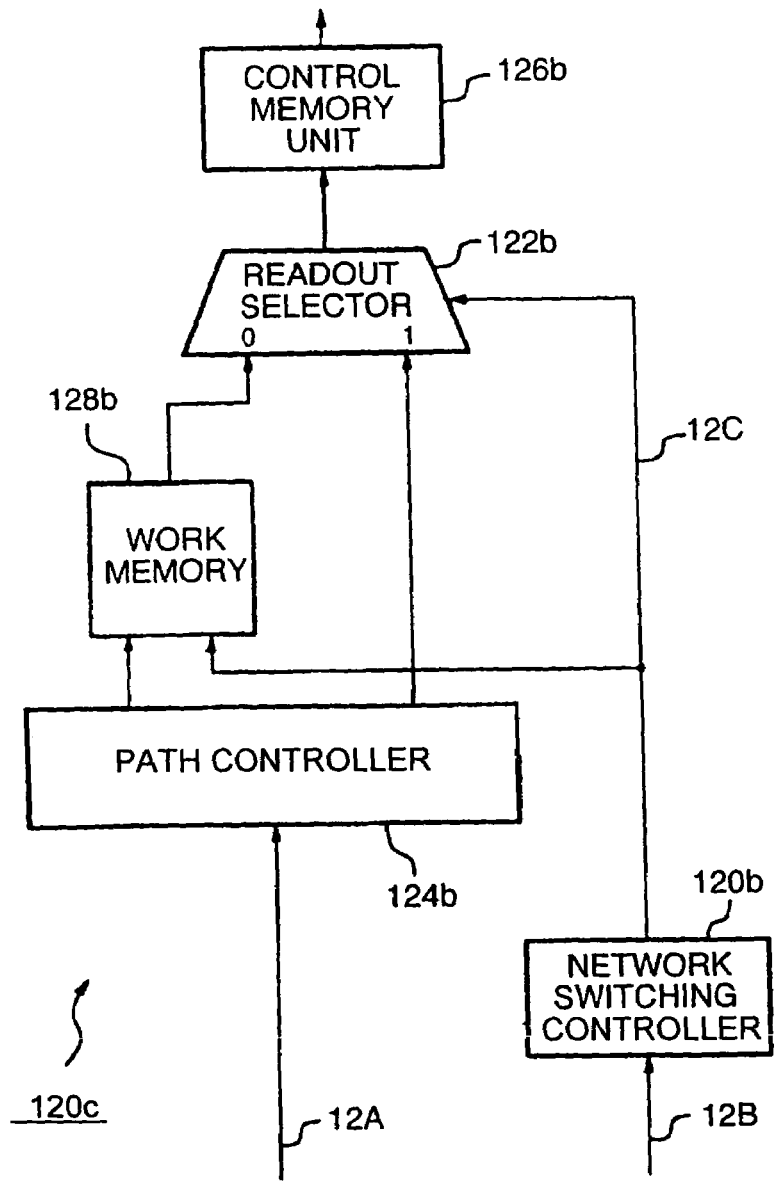
FIG. 6 is a block diagram broadly showing the configuration of another embodiment of a switching correspondence unit in the speech control equipment shown in FIG. 2, according to the invention.

FIG. 5 shows a digital switch 20 as a comparative example against the digital switch 10. The digital switch 20 has a redundancy configuration of a backup type with (n+1) lines of highways. The input highway interface unit, and the output highway interface unit, for inputting and outputting data, as described in the foregoing, may be used in such a way as to be adapted to such a configuration. A speech path apparatus 22 comprises a selector 220a, a highway switch (HSW) unit 222a, and a selector 224a. The selector 220a is connected with (n+1) lines of highways leading from an input highway interface unit 14. The selector 220a is a primary time switch. Connection information delivered from the upper layer controller is supplied to the selector 220a via a SWC 22b. Data are stored in the selector 220a according to the connection information. In read-out, data are sequentially read out into n lines of the highways, using respective counters (not shown).

The highway switch unit 222a is a space switch. For the highway switch unit 222a, there are available two types, i.e., a folded type of one-plane configuration, and a passing type of a bi-plane configuration, but taking into account limitations on circuits accommodated, trunk type, and so forth, the folded type is adopted. Information for receiving from an upper layer controller time slots of data supplied is delivered to the highway switch unit 222a. In the highway switch unit 222a, locations of the respective time slots are controlled according to the information. The time slots interchanged in this way are supplied to the selector 224a.

The selector 224a is a secondary time switch. The selector 224a makes use of the contents of the information used in, for example, the selector 220a, and outputs the same. The information is supplied through the intermediary of respective speech control memories (SCMs) (not shown), for controlling the selectors 220a, 224a, separated from each other, installed inside the SWC 22b.

With such a configuration as described above, when a request for switching of highways is made during normal operation, the information in current use for operation is switched over to a highway for backup use so as to be able to continue providing service. In the case where switching is anticipated beforehand, timings of respective highways to be switched over are synchronized with each other before effecting the switching, so that omission and duplication of data can be prevented from occurring in switching from a highway in current use to the highway for the backup. Further, in case of switching due to occurrence of trouble, the switching is effected so as to minimize the range of adverse effect of the trouble. In effecting such switching, transit time of data through a TDNW 22a is lengthened because transfer time of control information, in the order of several seconds, is required, delay time occurs due to clock synchronization to be effected, and so forth.

In contrast, with the digital switch 10 to which the system according to the invention is applied, the system can be rendered compact because the selectors causing a system configuration to be enlarged are not adopted in the TDNW 12a. Further, with the configuration of the system according to the invention, delay time of data can be reduced in comparison with that for the configuration using the selectors. In addition, since read-out from the SCMs 26a, 26b, respectively, is switched at the beginning of the frame in the respective highways, data switching can be attained without omission and duplication occurring between the highways.

Now, another embodiment of the invention as applied to the digital switch 10 is described hereinafter. With the embodiment, modification is applied to the configuration of a SWC 12b. For other constituents of the embodiment, the configuration as described in the foregoing may be adopted. Further, with the SWC 12b, constituents corresponding to those of the previously-described embodiment are denoted by like reference numerals. With the present embodiment, a work memory 128b is newly disposed between a path controller 124b and a read-out selector 122b. Connection information 12A is supplied to the work memory 128b via the path controller 124b. The connection information 12A contains addresses of a control memory unit 126b, and data by the switch unit. Addresses of the work memory 128b are written to the work memory 128b from the head address 0 towards an address at the end location by an upper layer controller such that the address contents of the control memory unit 126b will represent successive increases (refer to information on the work memory in FIG. 7). For example, write data 0, 1, 2, 3 corresponding to write addresses 0, 2, X, K–1, as shown in FIG. 7, respectively, are stored in the work memory 128b. The work memory 128b is disposed at the location of the control memory unit 126b according to the layout of the previously-described embodiment. A switching signal 12C delivered from a network switching controller 120b is supplied to the work memory 128b as a read-out timing signal. In other words, the read-out timing signal can be regarded a copying directive signal (or write timing signal) to the control memory unit 126b. It goes without saying that the read-out timing signal is in synchronization with the internal standard 8k frame.

The control memory unit 126b is disposed at a location where output from the read-out selector 122b is received. The network switching controller 120b generates the switching signal 12C to have a length of one frame. The read-out selector 122b executes switching at the falling edge of the switching signal 12C.

Now, the operation of the SWC 12b according to the present embodiment of the invention is described hereinafter referring to FIG. 8. The standard 8k frame shown in FIG. 8 (a) represents clock of the digital switch. As with the previously-described embodiment, a switching request signal S_Req. is supplied at timing t1. The connection information 12A is supplied to the work memory 128b via the path controller 124b during a time period, for example, from the rising edge of the switching request signal S_Req. to timing t2 of a switching directive signal 12B. The connection information 12A supplied at this point in time is connection information concerned with an object for switching, that is, connection information for backup use. The work memory 128b is in a write enable state during the time period when the connection information 12A is supplied {refer to FIG. 8 (e)}.

The work memory 128b is rendered in a write inhibit (WI) state in response to the rise of the t2. This is necessary in order to prevent written information from being rewritten. The write inhibit (WI) state lasts until the rise of the subsequent standard 8K frame. In synchronization with the standard 8K frame described, the network switching controller 120b generates a switching signal 12C. The switching signal 12C is supplied to the work memory 128b as the read-out timing signal. Upon receiving the signal, the work memory 128b is rendered in a read-out enable state. This state continues for the duration of, for example, one frame. The work memory 128b supplies the connection information for backup use, to be stored, to the control memory unit 126b via the read-out selector 122b. The control memory unit 126b writes the connection information 12A supplied by the switch unit by timing t4. The connection information 12A contains addresses as well as data of SCMs of the control memory unit 126b, and the data are written at the addresses of the memory, as designated.

The switching signal 12C is maintained at a level H until immediately before the rise (timing t4) of a subsequent standard 8k frame, and in synchronization with the rise of the frame, the switching signal 12C is caused to fall. At this point in time, the read-out selector 122b switches selection of the supply source of the connection information 12A, as supplied, from one for current use to one for backup use. That is, information from the path controller 124b, instead of information from the work memory 128b, is selected. The work memory 128b is kept in a switching standby state as well as a write enable state.

Thus, by supplying the connection information 12A for backup use to the control memory unit 126b before switching, it is possible to make the control memory unit 126b available for current use all the time. However, the control memory unit 126b also writes information as supplied while the switching signal 12C is being outputted, that is, during a time period between the timings t3, t4. This is possible because the control memory unit 126b adopts a two-port memory capable of executing write/read-out independently. Further, in the case of a one-port memory being adopted, write/read-out can be executed by time sharing.

Since the addresses of the memories of the control memory unit 126b are located in data-sending order of multiplexed data rows, the SPM 122a reads out data in sequential order. As. a result, random read-out with the data used as readout addresses of the SPM 122a is executed.

Referring to FIG. 9, the random read-out is described as follows. A case where the standard 8k frames shown in FIG.

9 and the timing of output from the SPM 122*a* are in synchronous relationship with each other is described. Accordingly, a switching request signal S_Req. rises at timing a little earlier than the rise of the standard 8k frame. The connection information 12A as the object for switching has already been written to the work memory 128*b*. The contents of memory as shown in FIG. 7 represent the contents of the connection information 12A written thereto. Read-out data {refer to FIG. 9 (*d*)} of the work memory 128*b* are written so as to correspond to addresses {refer to FIG. 9 (*c*)} of the work memory, respectively. The read-out data of the work memory, as shown at an upper level in FIG. 9 (*d*), represent write addresses of the work memory 128*b*, and the same, as shown at a lower level in the figure, represent write data of the work memory 128*b*.

Read-out of the data written to the work memory 128*b* is started by the switching signal 12C. The data that are read out are supplied to the SCM (not shown) of the control memory unit 126*b* via a terminal 0 of the read-out selector 122*b*. Based on the data supplied, data are written to address locations of the memory. Such writing of the data is executed, for example, in a time period when the switching signal 12C is at the level H, as shown in FIG. 9 (*e*), as being in a write enable state. Since the two-port memory is adopted for the control memory unit 126*b*, address data as immediately written upon synchronization with the rise of the standard 8k frame are read out to the SPM 122*a*. Such data become read-out addresses of the SPM 122*a*. Accordingly, the SPM 122*a* is subjected to control to read out data at the addresses "0, 1, 2, 3", respectively. As a result, the data that are read out are "a, b, c, d", corresponding to time slots (TS) "0, 2, X, K−1," respectively. The random read-out from the SPM 122*a* is executed through a series of steps as described above.

In this connection, since the address of the work memory 128*b* is short, read-out selection is switched at a point in time when the switching signal 12C as schematically shown in FIG. 9(*b*) disappears, however, if the timing relationship as described with reference to FIG. 8 is adopted, the switching signal 12C is preferably caused to fall at a point indicated by the arrow S.

The present embodiment of the invention is advantageous in that the work memory for storing the connection information after switching need only have a capacity required for one switching. Accordingly, the capacity can be reduced as compared with that of the memory according to the previously-described embodiment. Furthermore, since the connection information only as the object for switching may be managed, it is possible to simplify the controlling procedure of the upper layer controller.

The feature of the present embodiment of the invention, having the configuration as described above, lies in the fact that a switching operation is executed by switching taking into account routing of the connection information to be supplied to the TDNW 12*a*, while the previously-mentioned embodiment has been described with reference to the digital switch adopting the redundancy configuration. Consequently, the present embodiment can do without the redundant highway for backup use. That is, connection can be switched by dispersing into other highways data of a highway that are to be re-accommodated. This enables the resources of the digital switch to be drawn out at the maximum so as to be fully utilized to the extent that the highway for backup use is not incorporated.

Furthermore, data array (that is, the time slots) in the subscriber service, as accommodated in the highways, can be applied to rearrangement in management of the resources on the system side.

What is claimed is:

1. A digital switching system, comprising:
   multiplexing means for multiplexing time slots from a first plurality of circuits;
   switching memory means for storing and switching data of the time slots from the multiplexing means, for one frame period;
   switching control means including a switching correspondence means for directing interchange of the time slots stored in the switching memory means in response to a switching request from a network received through an upper layer controller; and
   demultiplexing means for demultiplexing into a second plurality of circuits, time slot data read out of the switching memory means using as addresses data from the switching correspondence means,
   the switching correspondence means comprising:
   information receiving means for receiving connection information from the upper layer controller;
   read-out controlling means for storing the connection information corresponding to before or after switching, received through the information receiving means, to addresses designated by the connection information in one of a first memory means and a second memory means, and for sequentially reading out the stored connection information in read-out order of the switching memory means;
   network switching control means for generating a switching signal in synchronization with an internal timing standard in response to the switching request provided by the upper layer controller; and
   read-out selection means for selecting read-out from one of the first memory means and the second memory means of the read-out controlling means in response to the switching signal provided by the network switching control means,
   wherein with respect to the read-out controlling means, the first memory means and the second memory means are each independently capable of simultaneously writing and reading.

2. A digital switching system according to claim 1, wherein the network switching control means generates the switching signal to coincide with a beginning of a frame.

3. A digital switching system, comprising:
   multiplexing means for multiplexing time slots from a first plurality of circuits;
   switching memory means for storing and switching data of the time slots from the multiplexing means, for one frame period;
   switching control means including a switching correspondence means for directing interchange of the time slots stored in the switching memory means in response to a switching request from a network received through an upper layer controller; and
   demultiplexing means for demultiplexing into a second plurality of circuits, time slot data read out of the switching memory means using as addresses data from the switching correspondence means, wherein the switching correspondence means comprises:
   information receiving means for receiving connection information corresponding to before or after switching from the upper layer controller;

network switching control means for generating a switching signal in synchronization with an internal timing standard in response to the switching request provided by the upper layer controller;

working memory means for storing the connection information from the information receiving means, the working memory means reading out as a read-out signal the stored connection information in response to the switching signal from the network switching control means;

read-out selection means for selecting the connection information from one of the working memory means and the information receiving means, and outputting the selected connection information in response to the switching signal from the network switching control means; and read-out controlling means for storing the connection data outputted by the readout selection means, and for sequentially reading out the stored connection information in read-out order of the switching memory means.

4. A digital switching system according to claim 3, wherein with respect to the switching correspondence means, the read-out controlling means is capable of simultaneously writing and reading.

5. A digital switching system according to claim 3, wherein the network switching control means generates the switching signal to coincide with a beginning of a frame.

* * * * *